United States Patent [19]

Aoyama et al.

[11] 4,114,643

[45] Sep. 19, 1978

[54] VALVE OPERATING MECHANISM OF INTERNAL COMBUSTION ENGINE

[75] Inventors: Syuniti Aoyama; Yoshimasa Hayashi, both of Yokohama; Yasuo Nakajima, Yokosuka, all of Japan

[73] Assignee: Nissan Motor Company, Limited, Japan

[21] Appl. No.: 791,243

[22] Filed: Apr. 27, 1977

Related U.S. Application Data

[62] Division of Ser. No. 702,073, Jul. 2, 1976.

[51] Int. Cl.² ............................................. F16K 21/14
[52] U.S. Cl. .................................. 137/495; 123/90.15

[58] Field of Search ....................... 137/495; 123/90.15

[56] References Cited

U.S. PATENT DOCUMENTS

| 626,594 | 6/1899 | Chapman | 137/495 |
| 3,741,240 | 6/1973 | Berriman | 137/495 X |

Primary Examiner—Harold W. Weakley

[57] ABSTRACT

The valve lift and the valve timing of the intake and exhaust valves of an internal combustion engine are changed in response to an engine operating condition. Furthermore, the intake and exhaust valves are maintained closed during deceleration of the engine.

5 Claims, 5 Drawing Figures

VALVE OPERATING MECHANISM OF INTERNAL COMBUSTION ENGINE

This is a division of application Ser. No. 702,073, filed July 2, 1976.

This invention relates to a mechanism for operating the intake and exhaust valves of an internal combustion engine, capable of changing the valve lift and the valve timing of the valves.

In conventional reciprocating engines, the valve timing of the engines is set to obtain the maximum volumetric and scavenging efficiencies at an engine speed from 3000 to 4000 rpm at which the maximum torque is produced. In order to make full use of the inertia effect of the intake air in addition to the above-described purpose, the opening timing of the intake valve is set at 10° to 20° before t.d.c. and the closing timing of the exhaust valve is set at 10° to 20° after t.d.c., whereas the closing timing of the intake valve is set at 50° to 60° after b.d.c. and the opening timing of the exhaust valve is set about 50° before b.d.c. causing so-called valve overlap. This valve overlap is effective in the above-described particular engine operating range.

However, difficulties have been encountered with this valve overlap, in which the air-fuel mixture supplied to the combustion chamber of the engine escapes to the exhaust system of the engine and conversely the exhaust gases flow back to the combustion chamber during low and medium load engine operations, particularly at idling. This invites disadvantage in exhaust gas control and deterioration of the fuel consumption and performance and efficiency of the engine. Furthermore, although the engines generally require less engine output power or do not require engine output power at all when the engine is abruptly decelerated from a high speed vehicle cruising, the conventional engine is inevitably operated to generate output power even during such a deceleration. Consequently, it will be a waste of fuel to operate the engine like that during the deceleration.

It is, therefore, a principal object of the present invention to provide an improved valve operating mechanism of an internal combustion engine, capable of changing the valve lift and the valve timing of the intake and exhaust valves of the engine in accordance with various engine operating conditions in order to meet the requirements in the various engine operating conditions.

Another object of the present invention is to provide an improved valve operating mechanism of an internal combustion engine, by which unnecessary engine output power generation can be prevented during deceleration of the engine.

A further object of the present invention is to provide an improved valve operating mechanism of an internal combustion engine, by which the valve overlap can be decreased or removed during idling or a low engine speed operation.

A still further object of the present invention is to provide an improved valve operating mechanism of an internal combustion engine, capable of rendering the valve lift of the intake and exhaust valves zero to maintain the valves closed during deceleration of the engine.

Other objects and features of the improved valve operating mechanism according to the present invention will become more apparent from the following description taken in conjunction with the accompanying drawings in which.

Figure 1:
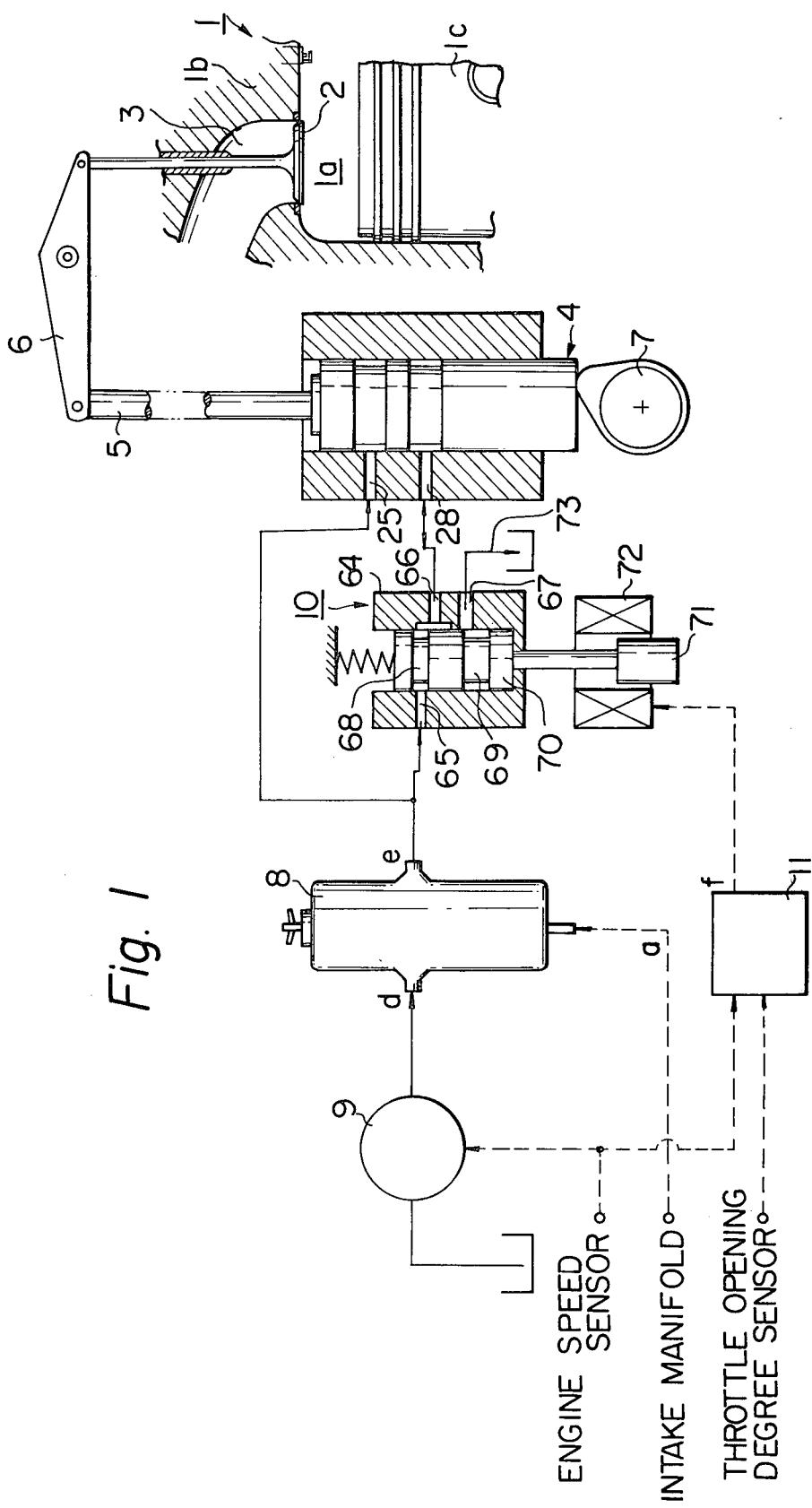
FIG. 1 is a schematic view of a preferred embodiment of a valve operating mechanism in accordance with the present invention.

Referring now to FIG. 1 of the drawings, there is shown a preferred embodiment of a valve operating mechanism of an internal combustion engine, in which the engine is designated by the reference numeral 1. The engine 1 has, as usual, combustion chambers 1a one of which is shown to be defined between the cylinder head 1b and the crown of a piston 1c which is reciprocally slidably disposed within the cylinder of the engine 1. A valve 2 or an engine operating valve is arranged to open or close a port 3 formed in the cylinder head 1b and is communicable with the combustion chamber 1a. The valve 2, as customary, is operated in the above-mentioned manner by a valve lifter 4 or valve lifter means through a push rod 5 and a rocker arm 6. In this case, the valve 2 is an intake valve and accordingly the port is an intake port. The valve 2 may be an exhaust valve wherein the port 3 will be an exhaust port. The valve lifter 4 is arranged to move upwardly or downwardly in the figure by a cam 7 which is rotatable by the engine crankshaft and the lifter 4 is capable of changing the valve lift and the valve timing of the valve 2 in response to the pressure of oil introduced thereinto. The oil is supplied through two lines (no numerals) from an oil pressure regulator 8 or pressure regulator means which is arranged to regulate the pressure of the oil delivered from an oil pump 9 in response to intake vacuum applied from an intake manifold or an intake vacuum source, which vacuum represents engine load. Of the two lines connecting the valve lifter 4 with the oil pressure regulator 8, one is for directly supplying the oil from the regulator 8 to the valve lifter 4 and the other for supplying it through a three-way valve 10. The three way valve 10 is arranged to change the oil flow direction therethrough in response to a signal representing deceleration of the engine, transmitted from a deceleration sensing device 11 which is arranged to generate the deceleration signal in response to a signal representing engine speed, generated by an engine speed sensor and a signal representing the throttle opening degree, generated by a throttle opening degree sensor.

Figure 2:
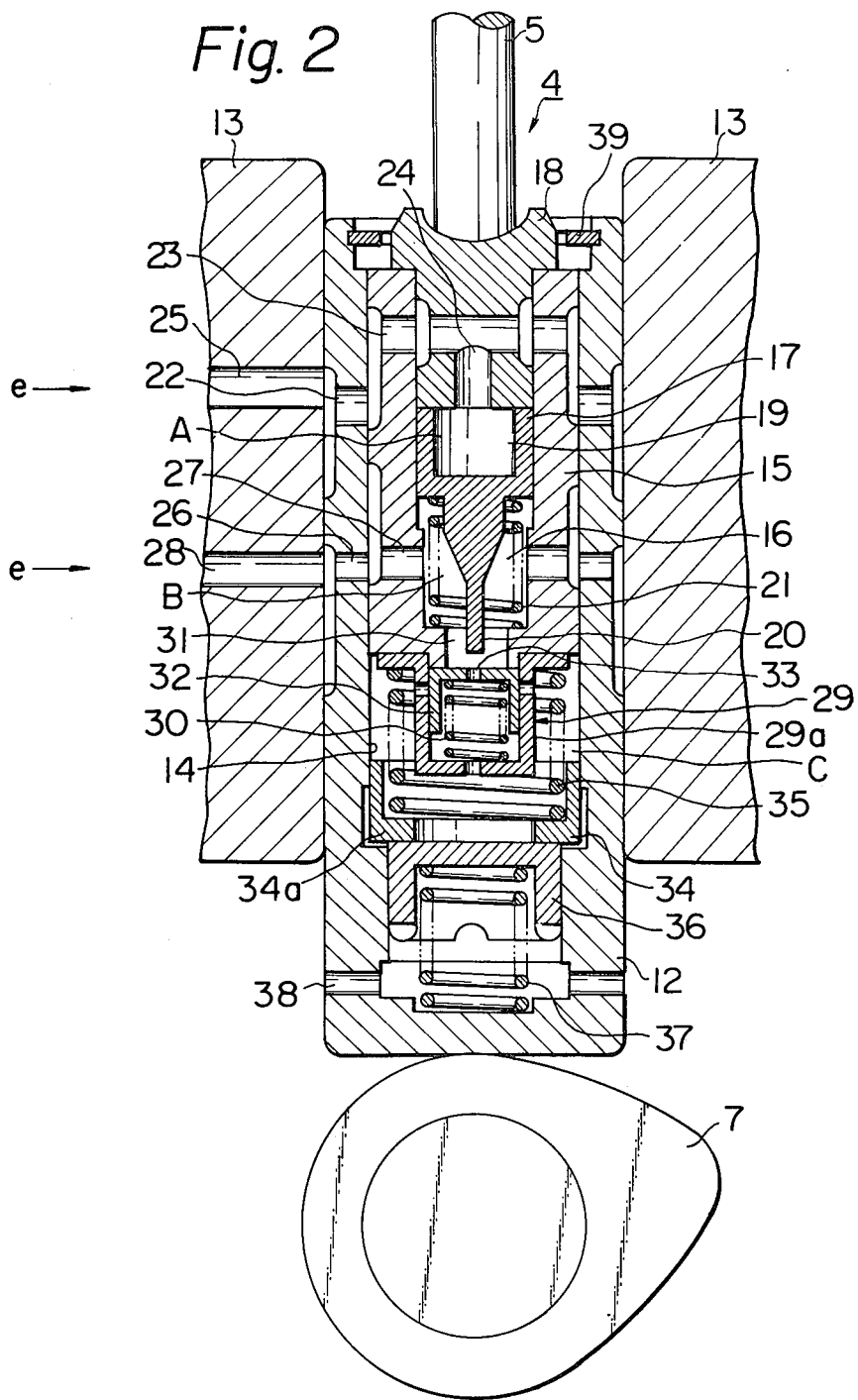
FIG. 2 is a longitudinal section view of the valve lifter of the mechanism of FIG. 1.

FIG. 2 illustrates in detail the construction of the valve lifter 4. The valve lifter 4 comprises a cylindrical lifter body 12 which is longitudinally slidably disposed within an axially extending bore (no numeral) formed in a portion of the engine, for example, a cylinder block 13. Slidably disposed within an axially extending cylindrical chamber 14 formed in the lifter body 12 is a hollow plunger 15 having an axially extending bore 16 in which a check piston 17 is slidably disposed. The hollow plunger 15 has at its upper portion or one end a push rod cap 18 which is securely inserted to the bore thereof for supporting the push rod 5. The check piston 17 is formed with a groove 19 at its upper side below the push rod cap 18 and with a pin-like projection 20 at its lower end. The check piston 17 is normally urged upwardly by a spring 21 or a first spring against the push rod cap 18 and divides the bore 16 into two chambers A and B or first and second chambers. Accordingly the chamber A defined by the groove 19 is formed within the check piston 17 while the chamber B is formed at a portion where the spring 21 is disposed. The chamber A is arranged to be fed with the oil which is introduced from an oil gallery 25 formed through the cylinder block 13 via hole 22 or a first hole formed through the lifter body 12, hole 23 or a third hole of the plunger 15 and a passageway 24 formed through the push rod cap 18, whereas the chamber B is arranged to be fed with the oil which is introduced from an oil gallery 28 formed through the cylinder block 13 via hole 26 or a second hole formed through the lifter body 12, and hole 27 or a fourth hole formed through the plunger 15.

As shown, formed under the plunger 15 is a chamber C or a third chamber which communicates with the chamber B through a check valve 29 disposed at the lower end of the plunger 15. The check valve 29 has a valve member 32 which is normally urged to close a hole 31 and arranged such that the projection 20 pushes downwardly the valve member 32 to open the hole 31 when the check piston 17 is moved downwardly. The valve member 32 is formed with a balancing opening 33 through the central portion thereof. As shown, the check valve 29 comprises a cup-shaped valve body 29a having at its cylindrical wall holes (no numeral) communicating the chamber B with the cylindrical chamber 14 of the lifter body 12. The closed end of the valve body 29a has a hole (no numeral) and the open end of the valve body 29a contacts the hollow plunger 15. The valve member 32 is slidably disposed inside of the valve body 29a defining a valve chamber (no numeral) between it and the closed end of the valve body 29a, the valve member 32 being contactable with the hollow plunger 15. A spring 30 or a fourth spring is disposed within the valve chamber for urging the valve member 32 to contact the hollow plunger 15 closing the holes formed through the cylindrical wall of the valve body 29a which holes are opened when the valve member 32 is pushed by the projection 20 of the check piston 17. Within the chamber C, a spring retainer 34 is disposed to retain a spring 35 or a second spring between it and the plunger 15. The spring 35 normally urges the plunger 15 and the check valve 29 upwardly with respect to the lifter body 12. In addition, a free piston 36 is disposed opposite to the plunger 15 within the chamber C to be pushed up by a spring 37 or a third spring until the free piston 36 reaches to the bent portion 34a of the spring retainer 34. An atmospheric chamber (no numeral) formed under the free piston 36 wherein the spring 37 is disposed is communicated through holes 38 with the atmosphere. A snap ring 39 is secured to the upper opening of the cylindrical chamber 14 to prevent the plunger 15 to get out of the cylinder chamber 14. It is to be noted that the gallery 25 is supplied with the output oil from the oil pressure regulator 8 whereas the gallery 28 is supplied with the same output oil through the three-way valve 10.

Figure 3:
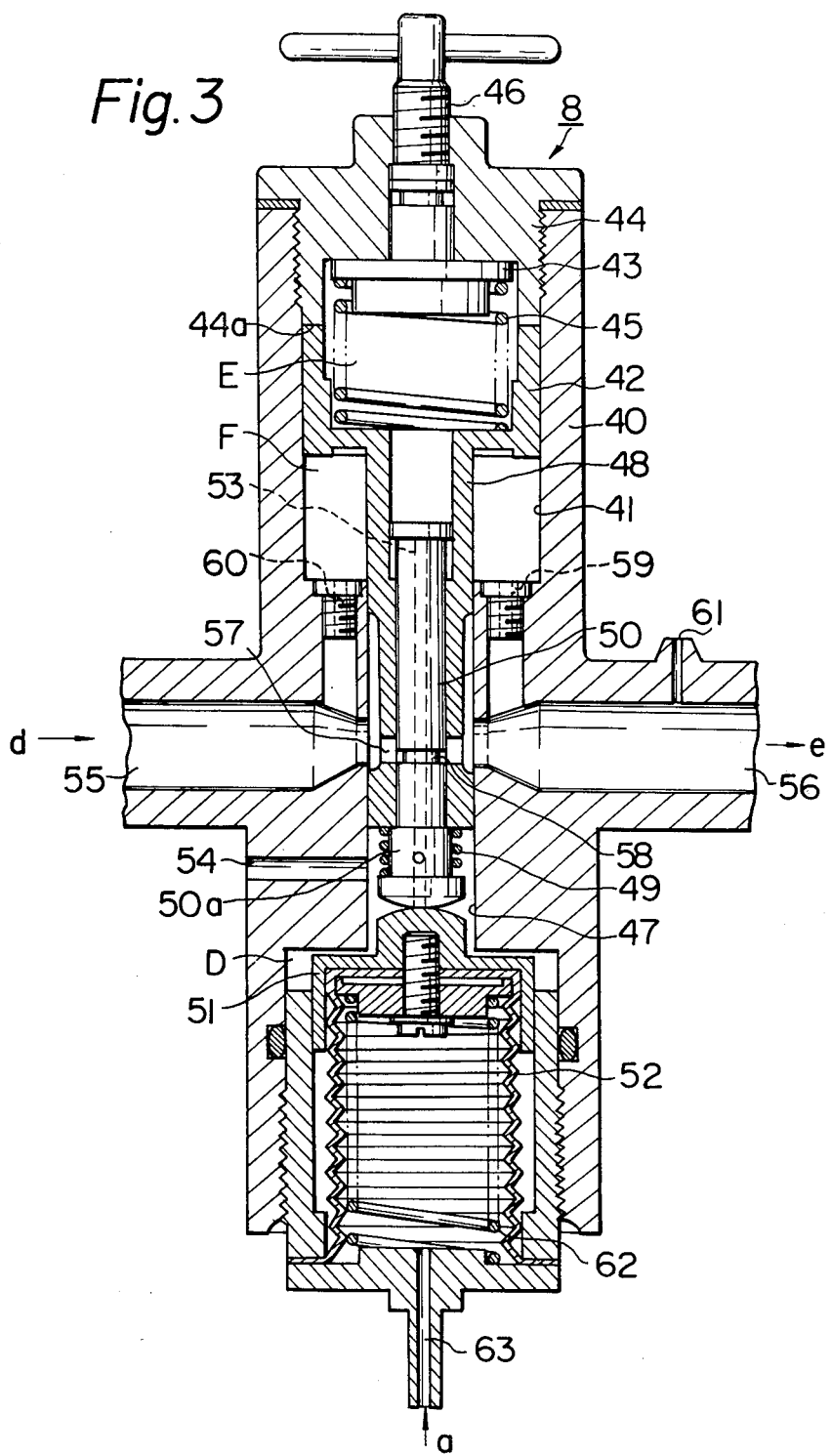
FIG. 3 is a longitudinal section view of the oil pressure regulator of the mechanism of FIG. 1.

FIG. 3 illustrates in detail the construction of the oil pressure regulator 8. The regulator 8 comprises a cylindrical regulator body 40 forming therein an axially extending cylindrical chamber 41 or a first cylindrical (operating) chamber in which a regulator piston 42 or a first responding means is longitudinally slidably disposed. The upper end of the cylindrical chamber 41 is securely closed with a spring retainer 43 at its top portion. A spring 45 or a first spring disposed between the retainer 43 and the regulator piston 42 urges the regulator piston 42 downwardly. The upper limit of the piston 42 is defined by a cylindrical portion 44a of the cylinder cap 44. The location of the spring retainer 43 with respect to the cylinder cap 44 is controllable by means of a screw 46 screwed through the cylinder cap 44.

The regulator body 40 is further formed with an axially extending bore 47 which is smaller in diameter than the chamber 41 and extends downwardly from the bottom portion of the cylindrical chamber 41. The regulator piston 42 has a hollow sleeve 48 which extends downwardly and is arranged to slidably move within the bore 47. Slidably disposed within the sleeve 48 is a switch piston 50 or a second responding means which is urged by a spring 49 or a second spring downwardly with respect to the regulator piston 42. The switch piston 50 has an enlarged portion 50a by which the upper limit of the switch piston 50 with respect to the regulator piston 42 is defined. The regulator body 40 is formed at its lower portion with a chamber D or a second cylindrical (operating) chamber which communicates with the bore 47. Disposed within the chamber D is a bellows 52 which has a bellows cap 51 and the bellows is capable of extending and contracting. A chamber E defined between the cylinder cap 44 and the regulator piston 42 always communicates with the chamber D through an opening 53 passing through the switch piston 50, and additionally communicates through a hole 54 with the atmosphere or a predetermined reference pressure source. The sleeve 48 and the switch piston 50 have respectively holes 57 and a ring groove 58 or a passage which cooperate and agree with each other to form a variable orifice which communicates an oil inlet 55 with an oil outlet 56. The oil inlet 55 communicates with the oil pump 9 which supplies the pressurized oil. The holes 57 and the ring groove 58 are arranged to allow the maximum flow of the oil therethrough or the maximum cross-sectional area of the agreed portion thereof when the switch piston 50 is at the upper limit with respect to the regulator piston 42. Formed under the regulator piston is a chamber F which communicates through a pressure balancing hole 59 with the oil outlet 56 and communicates with the oil inlet 55 through a pressure balancing hole 60 which is smaller in diameter than the pressure balancing hole 59. As seen, the oil outlet 56 is formed with an oil vent opening 61 for venting the excessive oil out of the oil outlet 56.

A spring 62 or a third spring disposed within the bellows 52 normally urges the bellows 52 to extend so that the bellows cap 51 contacts the lower end of the switch piston 50. The inner side of the bellows 52 is supplied with the intake vacuum or a control pressure through a vacuum inlet 63 which communicates with the intake manifold (not shown) of the engine.

Referring back to FIG. 1, the three-way valve 10 comprises a cylindrical body 64 forming therein a cylindrical chamber (no numeral). The body 64 is formed with oil inlet 65 and outlet 66 which are disposed at different locations with respect to the longitudinal axis of the cylindrical body 64, and is additionally formed with a hole 67 through which the cylindrical chamber of the body communicates with the outside of the body 64. Slidably disposed with the body 64 is a spool 70 formed with ring grooves 68 and 69 which are located parallel to each other. The spool 70 is securely connected to an actuator 71 made of a magnetic material which actuator is disposed within a solenoid coil 72 and arranged to move upwardly against the urging force of a spring (no numeral) to move upwardly the spool 70 when the solenoid coil 72 is energized. The solenoid coil 72 is electrically connected to the deceleration sensing device 11 and arranged to be energized when the device 11 generates and applies the signal representing deceleration of the engine.

The operation of the valve operating mechanism embodying the present invention will now be explained with reference to FIGS. 1 to 5. When the engine begins to operate, the oil pump 9 is driven in accordance with the engine speed to feed pressurized oil to the oil pressure regulator 8 for regulating the oil pressure in response to the intake vacuum. As shown in FIG. 3, when the switch piston 50 is at the upper limit, the maximum flow of oil passing from the oil inlet 55 to the oil outlet 56 is allowed through the passage defined by the cooperated or agreed holes 57 of the sleeve 48 and the ring groove 58 of the switch piston 50 to equalize the input pressure $d$ in the oil inlet 55 and the output pressure $e$ in the oil outlet 56. In this state, the oil pressure applied to the chamber F through the pressure balancing hole 59 from the oil outlet 56 pushes up the regulator piston 42 to the upper limit thereof against the urging force of the spring 45. When an intake vacuum $a$ is applied inside of the bellows 52, the bellows cap 51 is moved downwardly causing the switch piston 50 contacting the cap 51 to move downwardly by the action of the spring 49 in accordance with the movement of the bellows cap 51. As a result, the effective cross-sectional area of the passage defined by the cooperated or agreed holes 57 and the ring groove 58 is decreased and additionally the oil in the oil outlet 56 is discharged out of the outlet 56, and therefore the output pressure $e$ is lower than the input pressure $d$. With the lowering of the output pressure $e$, the oil pressure within the chamber F is lowered through the pressure balancing hole 59 causing the regulator piston 42 to move downwardly. By the action of the moved regulator piston 42, the agreed amount of the holes 57 and the ring groove 58 is gradually increased to provide the maximum effective cross-sectional area of the passage defined by the holes 57 and the ring groove 58. Accordingly, the output pressure $e$ and the pressure within the chamber F are increased to push up again the regulator piston 42. With this mehanism, the output pressure $e$ is balanced at a desired value lower than the input pressure $d$ in response to the descent distance of the switch piston 50.

While the diameter of the pressure balancing hole 59 is relatively small for the purpose of restricting the charging and discharging amount of the oil to the chamber F and of preventing rapid variation of the pressure within the chamber F, it will be understood that the pressure balancing hole 59 may be enlarged in diameter within the range for attaining the above-described purposes. It will be appreciated from the foregoing discussion that the oil pressure regulator 8 controls its output pressure $e$ at a value corresponding to the location of the switch piston 50. The outer pressure balancing hole 60 functions to allow a small quantity of oil to enter the chamber F even when the passage defined by the holes 57 and the ring groove 58 is completely closed by abrupt variation of the intake vacuum or a considerably high vacuum is applied to the inside of the bellows 52.

During increase of the input pressure from zero, the switch piston 50 is at the upper limit thereof by the coaction of the springs 45 and 62 and accordingly the output pressure $e$ increases with the input pressure $d$. It will be understood that the output pressure $e$ is regulated in response to the location of the switch piston 50 or the intake vacuum applied to the inside of the bellows 52 even during such increase of the input pressure from zero.

Figure 4:
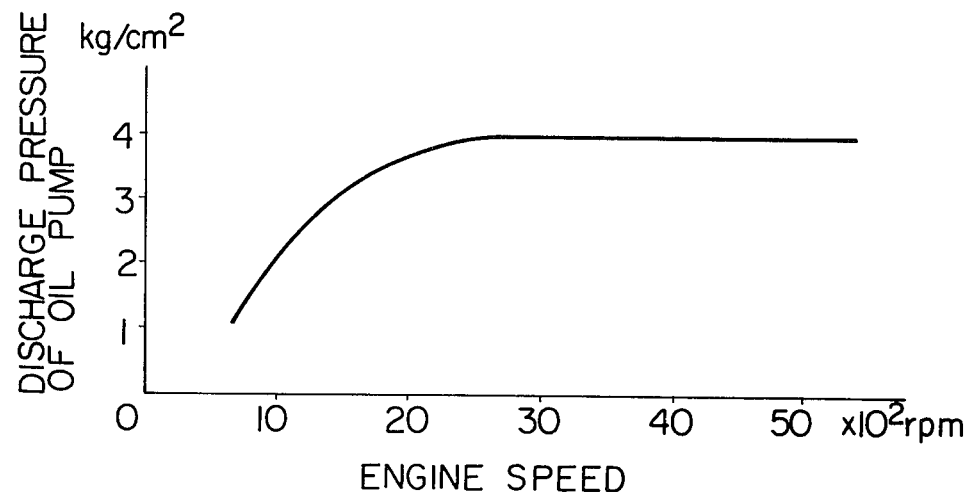
FIG. 4 is a graph showing the relationship between the engine speed and the discharge pressure of the oil pump of FIG. 1.

FIG. 4 shows the relationship between the discharge pressure of the oil pump 9 and the engine speed, in which the discharge pressure of the oil pump 9 increases with the increase of the engine speed up to an engine speed of about 2500 rpm and thereafter the discharge pressure is maintained at 4 to 5 Kg/cm$^2$ by a relief valve (not shown) of the oil pump 9. It will be noted that the maintained pressure will be different in different engines or pumps. As is apparent from the foregoing discussion, the discharge pressure of the oil pump 9 during the low engine speed or idling of the engine is lower than that during high engine speed. Even during medium and high engine speeds, the output pressure $e$ of the oil pressure regulator 8 is relatively low when the engine load is within a low and medium range, and accordingly the intake vacuum is relatively high.

The thus regulated oil pressure will be applied to the valve lifter 4 to change the effective stroke of the valve lifter for the purpose of changing the valve lift and the valve timing of the intake and exhaust valves. When the spool 70 of the three-way valve 10 is at the position as shown in FIG. 1 and the same output pressure $e$ from the oil pressure regulator 8 is applied to both galleries 25 and 28, the equal oil pressure is applied to the chamber A and B of the valve lifter 4 shown in FIG. 2 and consequently the check piston 17 is pushed up by the spring 21 to contact the push rod cap 18. The oil supplied to the gallery 28 is introduced through the check valve 29 to the chamber C to push up the plunger 15 with respect to the lifter body 12 to maintain zero tappet clearance or clearances between the valve lifter 4 and the push rod 5 or the cam 7. In this case, the characteristics of the spring 37 is selected such that the free piston 36 is at its upper limit when the oil pressure within the chamber C is at a low level corresponding to the idling condition of the engine but at its lower limit when the oil pressure within the chamber C is at a high level corresponding to high speed and high load operation of the engine. By the action of the spring 37, during the high speed and high load engine operation wherein the free piston 36 is at its lower limit, and when the cam 7 is rotated to apply a force for pushing up the lifter body 12, the check valve 29 is closed to push up the plunger 15 with the lifter body 12. Accordingly, the valve lifter 4 operates the intake valve with the head 2 through the push rod 5 and the rocker arm 6 at the valve timing and the valve lift in accordance with the profile of the cam 7. It will be understood that the exhaust valve is also operated in the same manner as the intake valve though not shown.

When the engine speed or the engine load is decreased, the oil pressure in the chamber C is decreased and therefore the urging force of the spring 37 overcomes the oil pressure. In this state, when the lifter body 12 is not pushed up by the cam 7 and is at its non-operated state, the free piston 36 moves upwardly to a location where the urging force of the spring 37 and the oil pressure applied to the free piston 36 are balanced. In this connection, during the idling condition, the location of the free piston 36 will be the upper limit thereof. From this non-operated state, when the lifter body 12 is pushed up by the cam 7 and changed into its operated state, the oil within the chamber C is pressed by the plunger 15 and therefore the oil pressure is abruptly increased causing the free piston 36 to move downwardly to its lower limit. Then, the plunger 15 is moved downwardly with respect to the lifter body 12 by a distance $\Delta h$ which corresponds to the volume change of the chamber C occurred by the movement of the free piston 36. As a result, as shown in FIG. 5, the valve lift of the valve 2 is decreased by the $\Delta h$ and the valve timing of the same is changed from curves X corresponding to the high speed and high load engine operation into curves Y, and therefore the valve overlap Vo is removed.

Figure 5:
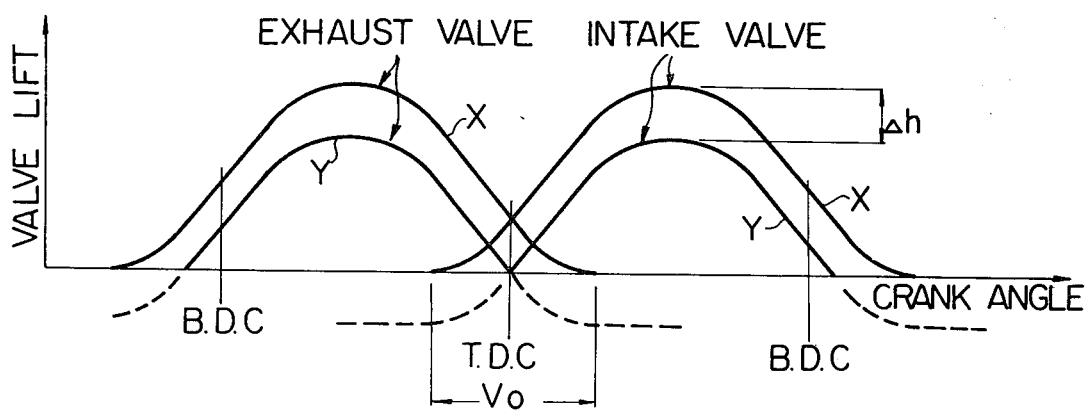
FIG. 5 is a graph showing the change of the valve timing and the valve lift of the intake and exhaust valves of the engine of FIG. 1.

While an example wherein the same valve lift change characteristics of the intake and exhaust valves is employed has been shown in FIG. 5, it will be understood that the characteristics of the intake and exhaust valves may be different from each other, or the characteristics of only one of the intake and exhaust valves may be changed in accordance with the present invention.

When the signal $f$ representing the deceleration of the engine is transmitted to the solenoid coil 72 to operate the actuator 71, the spool 70 of the three-way valve 10 is moved upwardly from the position shown in FIG. 1. Then, the oil passage formed in the three-way valve 10 is changed such that the oil supply to the gallery 28 is released to a line 73 to abruptly decrease the amount of the oil in the chamber B. However, the chamber A is still supplied with the oil which is directly introduced from the oil pressure regulator 8 and therefore the check piston 17 of the valve lifter 4 is moved downwardly against the force of the spring 21 so that the projection 20 of the check piston 17 pushes down the valve member 32 of the check valve 29 to communicate the chambers C and B through the holes formed through the wall of the check valve body 29a. In this state, when the pushing force by the cam 7 is applied to the lifter body 12, the oil in the chamber C flows into the chamber B so that the plunger 15 is moved downwardly with respect to the lifter body 12 by a distance lifted by the profile of the cam 7. Therefore, the valve lifter 4 does not move the valve 2 at all and the intake valve is allowed to be completely closed. It is to be noted that the completely closed state of the intake valve 2 arises only when pressure differential between the galleries 28 and 25 exceeds a predetermined level and accordingly the intake and exhaust valves are not closed completely when unnecessary even if the oil pressures of both galleries 28 and 25 are relatively low. This does not result in any trouble during engine start.

It will be understood that the intake vacuum applied to the oil pressure regulator 8 may be replaced with a venturi vacuum produced in a carburetor of the engine to lower the output pressure of the oil pressure regulator 8 during a low engine load.

As is apparent from the foregoing discussion, according to the present invention, although the intake and exhaust valves are conventionally operated with a desired valve overlap during a high engine speed, the valve overlap is decreased or removed by the effect of lowered oil pressure during a low engine speed or idling of the engine. Furthermore, when abruptly decelerated from a high vehicle cruising speed, the valve lift of the intake and exhaust valves becomes zero to completely close the valves, preventing generation of unnecessary engine output power. This contributes to fuel economy and to an improvement in the deceleration effect of the engine.

What is claimed is:

1. A pressure regulator for regulating the pressure of a fluid to a predetermined level in response to a control pressure, comprising:
   a body having a fluid inlet, a fluid outlet, a first operating chamber which is supplied with the fluid pressure of said fluid outlet, a second operating chamber which is supplied with the control pressure, and a passage means for communicable between said fluid inlet and said fluid outlet;
   a first responding means for being operated in response to the fluid pressure within the first operating chamber;
   a first control member which is movably disposed at said passage means and arranged to move with said first responding means;
   a second responding means for being operated in response to the fluid pressure within said second operating chamber;
   a second control member which cooperates with said first control member to form a variable orifice in said passage means, said second control member being arranged to move with said second responding means.

2. A pressure regulator as claimed in claim 1, in which said first control member is a sleeve slidably disposed in the bore of said body formed across the passage means, said sleeve having a hole communicated with said passage means.

3. A pressure regulator as claimed in claim 2, in which said second control member is a switch piston slidably disposed in said sleeve, said switch piston having a passage agreeable with the hole of said sleeve to form the variable orifice which communicates with said fluid inlet and said fluid outlet.

4. A pressure regulator as claimed in claim 2, in which said hole of said sleeve is formed through the wall of said sleeve.

5. A pressure regulator as claimed in claim 3, in which said passage of said switch piston is a ring groove agreeable with said hole of said sleeve.

* * * * *